United States Patent [19]

Ryals

[11] 4,438,819
[45] Mar. 27, 1984

[54] RICE LEVEE SHAPER AND PACKER

[76] Inventor: Lloyd E. Ryals, P.O. Box 98, Dundee, Miss. 38620

[21] Appl. No.: 380,686

[22] Filed: May 21, 1982

[51] Int. Cl.³ .................... A01B 29/00; A01B 49/06
[52] U.S. Cl. .................................. 172/536; 172/176; 172/611; 404/124; 404/127
[58] Field of Search ............... 172/536, 537, 539, 744, 172/701, 170, 176, 518, 519; 404/124, 122, 127, 129, 132

[56] References Cited

U.S. PATENT DOCUMENTS

| | | | |
|---|---|---|---|
| 827,587 | 7/1906 | Warner | 404/124 X |
| 1,040,041 | 10/1912 | Slomski | 172/240 X |
| 2,221,764 | 11/1940 | Graham | 172/240 X |
| 2,983,204 | 5/1961 | Floden | 404/132 |
| 3,303,799 | 2/1967 | Britt | 404/124 |
| 3,454,104 | 7/1969 | Fuchs | 172/176 |
| 4,131,162 | 12/1978 | Schmitz | 172/467 |

FOREIGN PATENT DOCUMENTS 10005 of 1894 United Kingdom ............... 172/539

Primary Examiner—Richard J. Johnson
Attorney, Agent, or Firm—Parrish & Mulrooney

[57] ABSTRACT

An improved land vehicle for constructing rice levees comprises a unitary, ground contacting roller-wheel assembly surrounded by a frame member. The shape and size of the roller permits the construction of rice levees having the desired shape and dimensions. The roller is hollow so that it may be filled with materials as desired to vary its weight and thereby adapt it for varying rice field conditions. Tires mounted on the roller-wheel assembly function to aid in levee construction and to allow the vehicle to be transported without the use of special equipment.

2 Claims, 7 Drawing Figures

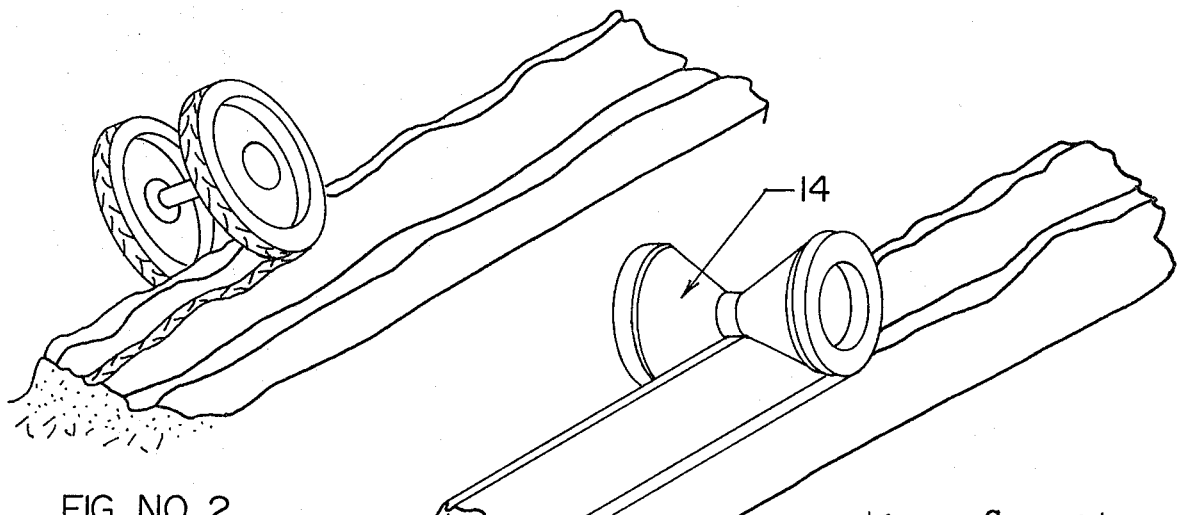
FIG. NO. 2
FIG. NO. 7
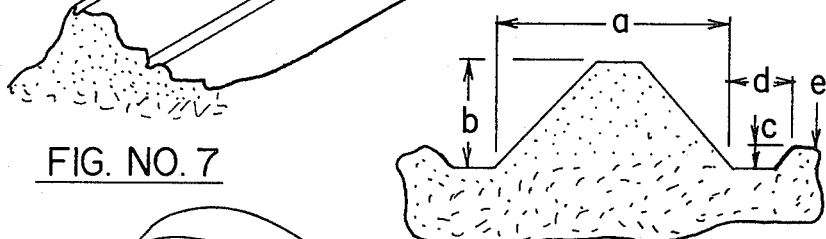
FIG. NO. 1
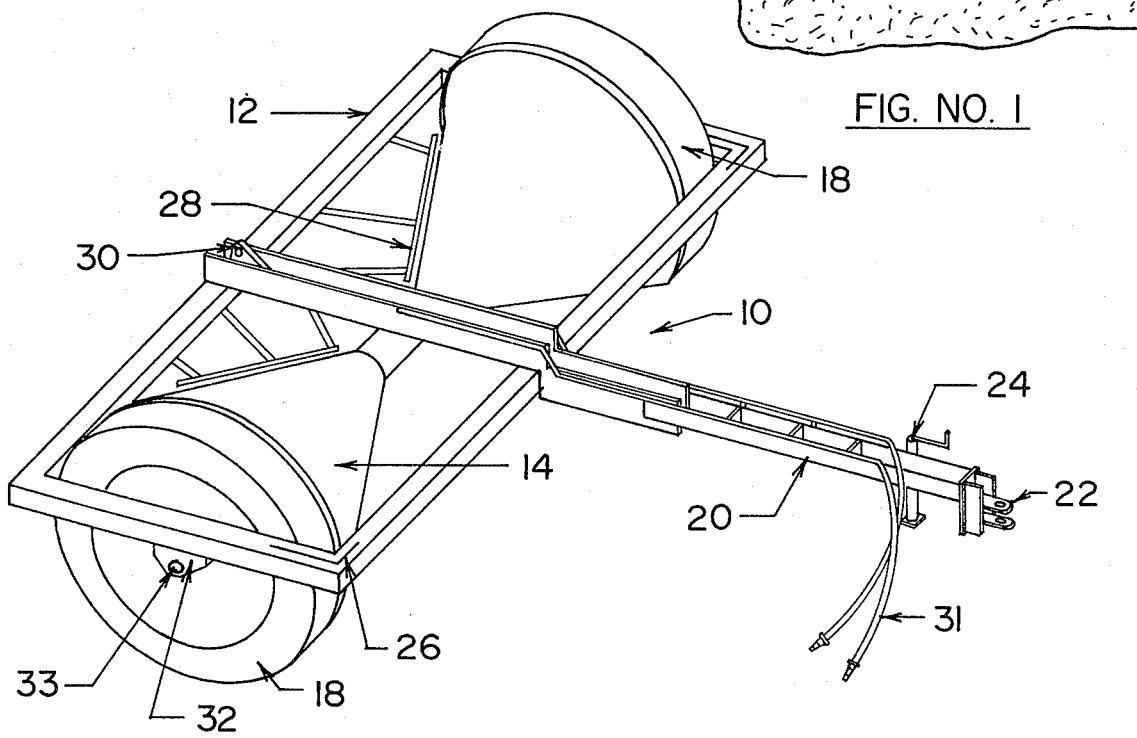
FIG. NO. 3

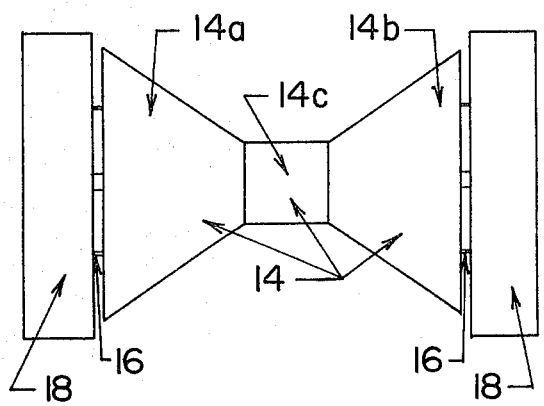
FIG. NO. 5
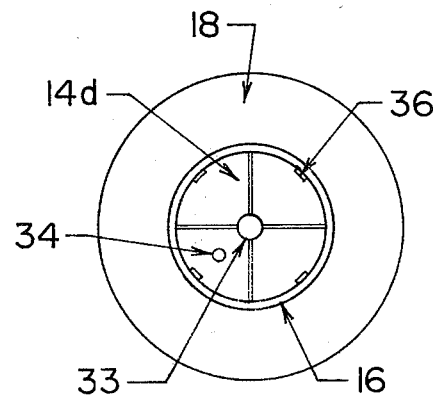
FIG. NO. 6
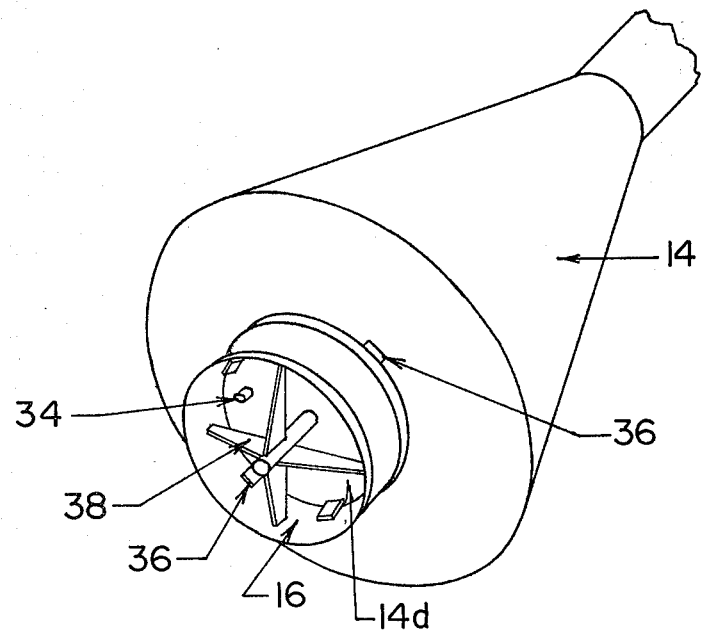
FIG. NO. 4

RICE LEVEE SHAPER AND PACKER

BACKGROUND OF THE INVENTION

1. Field of the Invention

This invention relates generally to agricultural equipment useful in rice levee construction and, more particularly, to an improved portable rice levee shaper and packer for the controlled, efficient and convenient shaping, packing and seeding of rice levees.

2. Description of the Prior Art

Rice levee farming requires the preparation of rice fields by the construction of levees which function to distribute and maintain a uniform flood of water from the highest to the lowest elevation in the field. Ideally, the levees will comprise (FIG. 1) mounds of earth having a width (a) of approximately 66 inches, the height (b) of which is approximately 24 inches above the bottom of a pair of furrows adjacent each side of the mound. Each furrow has a depth (c) of approximately 6 inches below the bay elevation (e) and a width (d) of approximately 27 inches. It is essential to successful rice farming that the levees be both located accurately and well constructed to achieve and regulate a uniform water depth within each bay between the levees.

The construction of rice levees is the most difficult task involved in rice production. The levees cannot be formed until the rice has been seeded and, after the rice is planted, there is a limited time to get the levees constructed and firmed before a rain occurs. Rice is most often planted in clay or clay loam soils which normally have poor internal drainage. Before a levee constructed of such soil will hold water it must be thoroughly packed and settled.

Heretofore, the most successful method for constructing rice levees has been the use of a disc levee plough and dual wheel tractor. As the levee plough is pulled through the field, the discs cause an accumulation of earth along the desired location of the levee. Normally, on heavy clay soils, at least four or five, and sometimes more, passes of the levee plough are required to achieve the desired height of approximately 24 inches for the levee. Thereafter, the dual rear tractor tires are repeatedly driven over the mound of earth in an attempt to compact the levee (FIG. 2).

However, in the formation of levees with a levee plow, the plow breaks the soil into large clods which make compaction and settlement of the levees very difficult, particularly when the dual rear tractor tires are used for that purpose. The resulting levee is an irregularly shaped and loosely packed mound of soil having weak spots in the form of low spots or gaps which cause rapid deterioration of the levee unless it is repaired (completed by hand with shovels in a laborious, costly and time consuming manner.

This prior art method for constructing rice levees is time consuming, inefficient and largely ineffective. The many passes with the levee plough required to accumulate the necessary soil creates an additional problem in the form of deep grooves adjacent each levee thereby making water management in each bay impossible without additional time consuming and costly soil relocation.

Hence, the prior method of shaping and packing rice levees is inefficient in the amount of time required, expensive because of the labor, equipment and fuel involved and finally does not produce a firm and uniformally shaped and packed a levee as needed for optimum yield rice farming.

Ideally, the construction of rice levees should be accomplished in an efficient manner utilizing relatively simple, mechanized equipment without the need for many passes of a levee plough to create a levee mound and thereafter many passes of dual tractor wheels in an attempt to compact the rice levee.

SUMMARY OF THE INVENTION

The present invention relates to a portable rice levee shaper and packer comprising a roller-wheel assembly designed to shape a mound of soil into a compacted rice levee.

It is, therefore, a general object of the present invention to provide an improved means and method for constructing rice levees.

It is a further object of the present invention to provide an improved rice levee shaper and packer.

It is a further object of the present invention to provide an improved means and method for constructing a rice levee having a uniform shape, height and width.

it is a further object of the present invention to provide a rice levee shaper and packer which prepares the soil for rice seeding and which allows the seeding by means of a seeder which is chain driven from the roller-wheel assembly.

It is a further object of the present invention to provide a rice levee shaper and packer which eliminates structural defects in the rice levee.

It is a further object of the present invention to provide a rice levee shaper and packer which can be varied in weight as required by the field conditions and circumstances of its use.

It is a further object of the present invention to provide a rice levee packer and shaper which is designed to prevent the caking and accumulation of wet soil or clay thereon, thereby allowing levee formation under adverse soil conditions.

It is a further object of the present invention to provide a rice levee shaper and packer which does not require a hydraulic lift or a vehicle for mounting and which may be transported on wheels which form an integral part thereof.

Other objects and advantages of the invention will be evident from the following detailed description when read in conjunction with the accompanying drawings which illustrate the invention.

BRIEF DESCRIPTION OF THE DRAWINGS

FIG. 1 is an elevational view illustrating a cross section of a typical rice levee formed by the present invention.

FIG. 2 is a perspective view partially in section showing the prior art method of using dual rear tractor tires to shape and compact a rice levee.

FIG. 3 is a perspective view of a preferred embodiment the rice levee shaper and packer of the present invention.

FIG. 4 is a perspective view in partial section of the roller-wheel assembly (without tire) of the present invention.

FIG. 5 is a front elevational view of the roller-wheel assembly of the present invention.

FIG. 6 is a side elevational view of the roller-wheel assembly of the present invention.

FIG. 7 is a perspective view in partial section showing the roller-wheel assembly of the present invention in use shaping and packing a mound of soil into a rice levee.

DESCRIPTION OF THE PREFERRED EMBODIMENTS

Referring now to FIG. 3, the rice levee shaper and packer of the present invention is illustrated generally by the numeral 10. The invention basically comprises a rectangular chasis or frame 12 having a spool or roller 14 with integrally mounted wheels or rims 16 (FIG. 4) with tires 18 mounted thereon. Frame 12 has a tongue 20 and hitch 22, a jack-stand 24, a weight rack 26 and a mud or soil scraper 28. Frame 12 also includes hydraulic brace means symbolically illustrated at 30 whereby optional hydraulic equipment (hereinafter described) may be connected and utilizied. Such hydraulic equipment is powered through hydraulic lines 31.

Referring now to the drawings, FIGS. 5 and 6 show respectively in front and side elevation the integral roller-wheel assembly of the present invention. The spool or roller 14 is symmetrically shaped in the form of two cone sections 14(a) and 14(b) separated by a horizontal cylindrical portion 14(c). Each cone section has a relatively large outwardly facing base 14(d) and an inwardly and downwardly sloping surface extending to one end of said cylindrical portion 14(c).

A wheel or rim 16 is integrally mounted and afixed to the outer end of each spool 14 by means of mounting spacers 36. The spool (roller) 14 is constructed of metal and is hollow inside. Each wheel 16 has a plurality of gussets 38 mounted between bearing axle 33 and the rim of wheel 16. An access spout or valve 34, FIG. 4 located at each end of the spool 14 allows the spool to be filled with water or other material so that the weight of the roller may be selectively varied. Typically, the weight of the roller will vary from about 3,000 pounds (unfilled) to about 12,000 pounds (filled), or more, depending on the desired weight as determined by the conditions of the rice field and soil. The machine is 96 inches wide, measured from frame side to frame side. The overall shape and dimensions of the roller-wheel assembly is such that a rice levee of desired shape and size is automatically constructed by its use as hereinafter described.

The tires 18 are mounted on the rims 16 and are selected to extend several inches past the adjacent ends of the spool and thereby maintain the spool in a position off the ground and permit transportation thereon. Bearings 32 (FIGS. 3, 4 and 6) allow for mounting of the frame 12 on the roller-wheel assembly.

The design and selection of the roller 14 and tires 18 are such that the circumference of tires 18 travel a distance of eleven feet for each revolution as compared to a distance of three feet that the circumference of roll horizontal cylinder 14(c) travels along the top surface of the levee. This has the effect of causing soil to be pushed along in front of the roller to fill in all low spots in the levee mound.

The operation of the rice levee shaper and packer in rice levee construction is as follows: a disc-type levee plough is used to create a mound of soil at the desired levee location. Because of the levee shaping capacity of the present invention, only one or two passes of the disc-type levee plough is required whereas the prior art method required eight or ten passes of the levee plough. After the mound of soil is prepared, the rice levee shaper and packer of the present invention is rolled over the mound as illustrated in FIG. 7. The roller functions to shape and pack the soil in a single pass into a rice levee having the shape and size needed for successful rice farming.

The shape and dimensions of the integrally constructed roller-wheel assembly are such that the relative movement of the wheel (tire) (one revolution equals eleven feet) and the horizontal cylindrical portion of the roller (one revolution equals three feet) causes the soil to be rolled, graded and pushed forward by the roller to completely fill all low spots in the levee, and such action effectively prevents soil, particularly mud, from adhering to the roller surface.

Rice levees constructed with the present invention do not have defects such as gaps or low or weak spots which were inherent in the prior art method and had to be repaired by hand. Use of the present invention causes the large clods of soil to be crushed and conformed with the other soil into a perfectly shaped, fully compacted rice levee which is immediately capable of distributing and maintaining a flood of water and forming a seed bed making it possible in obtaining a stand of rice.

The jack-stand 24 mounted on frame tongue 20 allows for single-man mounting and dismounting of the levee shaper and packer. The frame assembly 12 is constructed for highway length and width making transportation of the equipment safe and easy without the need for additional equipment to load, transport and unload the packer.

Additional equipment which may be mounted on the frame 10 for use with the invention comprise weight racks 26 located at each end of the frame to allow for additional weights which are commonly used with farm equipment to increase the weight thereof and obtain better packing of the levee.

Hydraulic brace 30 can be located on the frame assembly 12 to allow for the connection of hydraulically operated equipment such as an optional disc assembly (not shown) to be mounted on the outside back edges of the frame 12. Such an optional disc assembly could be used to aid in filling in any groove or ditch formed by the levee plough on each side of the levee. This would reduce the depth of any such groove and thus promote rice growth at the edges of the levee by helping control the depth of water in the levee bays.

A seeder unit or augar may be mounted on the packer frame 12 to distribute seed. Such a seeder augar (not shown) could be powered by a direct drive from the spool 14. Such a direct drive connection would allow seeding to be coordinated with the velocity of the packer thus allowing for uniform seeding for any speed of the packer. Thus, the seeding could be done more uniformally and economically.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A land shaper and packer assembly for agricultural use in the construction of rice levees for shaping a ridge of loosely packed soil into a compacted ridge of uniform width and substantially flat top, having a furrow of uniform width and depth adjacent each side thereof, and with said ridge having a substantially fixed height relative to the bottoms of said furrows, said assembly comprising:

a frame including a tow bar secured thereto, an integral roller-wheel assembly rotatably secured to said frame and having an adjustable weight greater than 3,000 pounds, said roller having first and second symmetrical end parts connected by a horizontally positioned cylindrical part having a uniform fixed diameter, said first and second end parts each being identically frusto-conically shaped and having a relatively large outwardly facing end base member and an inwardly sloping surface extending from said base to one end of said cylindrical part; an axle extending through said roller and having opposite ends journaled in said frame wheel means integrally coaxially connected to each said base to rotate therewith for supporting a pneumatic tire; first and second pneumatic tires mounted on said wheel means, said tires having a diameter larger than the diameter of said bases whereby said tires maintain the roller in a position off the ground when towed along a roadway and form said furrows adjacent said ridge of soil; said tires having a diameter approximately three times greater than the diameter of said cylindrical part whereby rotation of said tires in the formation of a rice levee causes the roller to be rolled and dragged along said ridge of soil so that the soil is rolled, graded and pushed forward by said roller surfaces to completely fill in and compact all spots in said levee.

2. The assembly of claim 1 further comprising valve means located in said roller whereby said roller may be filled with a material to selectively vary the weight of said roller.

* * * * *